Oct. 12, 1954        C. A. LANG        2,691,492
FISHING DEVICE, INCLUDING FISHING REEL AND HOUSING
Filed July 20, 1951
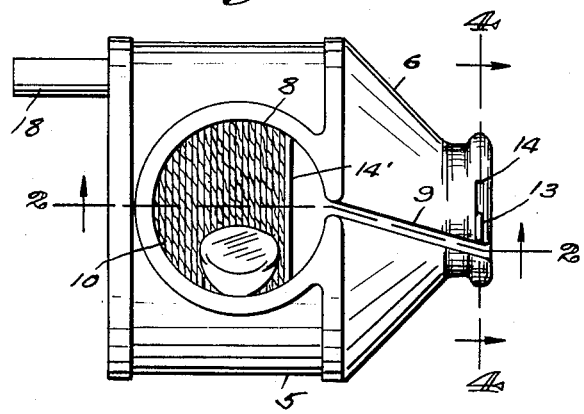
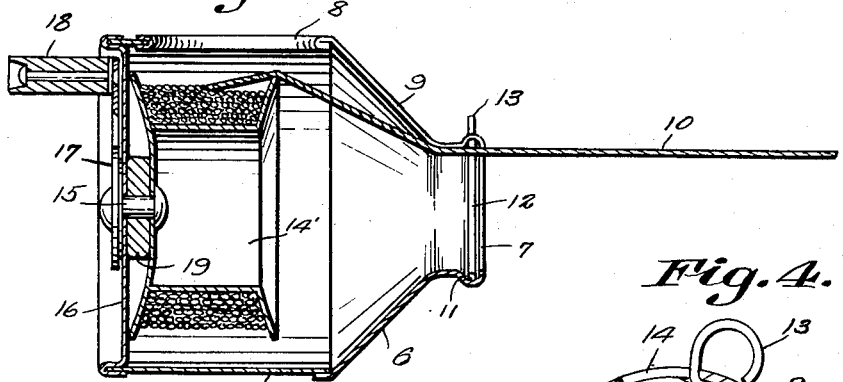
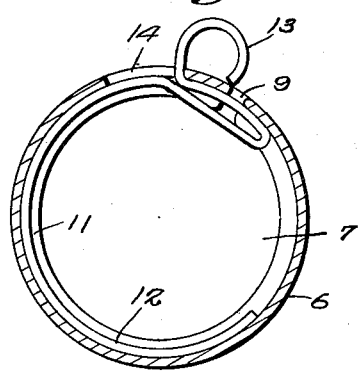
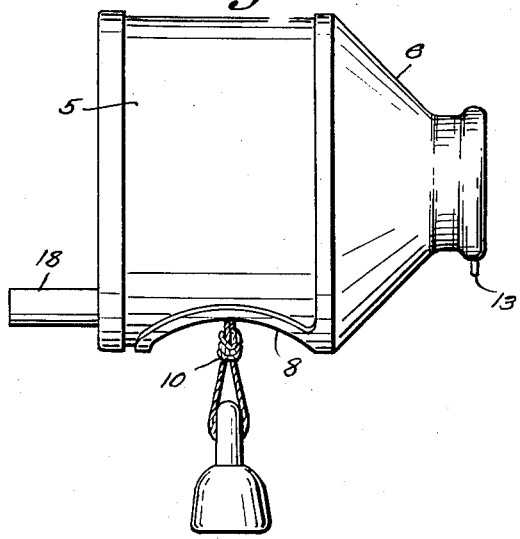
C. A. Lang
INVENTOR,
BY *C. A. Snowles*
ATTORNEYS.

Patented Oct. 12, 1954

2,691,492

UNITED STATES PATENT OFFICE 2,691,492

FISHING DEVICE, INCLUDING FISHING REEL AND HOUSING

Clarence A. Lang, Omaha, Nebr.

Application July 20, 1951, Serial No. 237,700

2 Claims. (Cl. 242—97)

1

This invention relates to a device designed for use by fishermen and comprises a housing in which a fishing spool is mounted, the housing being so constructed and arranged that it may be grasped in the hand and the line cast from the housing to locate the hook and bait of the line at a particular point much in the same manner as when a fishing rod is used in casting.

An important object of the invention is to provide a device of this character including a housing having an opening at one end thereof which opening is arranged so that the outer edge thereof is parallel to the sides of the spool mounted within the housing, to the end that the line being unreeled will pass over the edge of the spool to insure against the line becoming tangled.

A still further object of the invention is to provide a housing in which a fishing spool is supported, the housing having a substantially large opening in the side wall thereof, the walls of the opening in the side of the housing being parallel with the axis of the spool so that the fishing line when wound on the spool will be directed to the line supporting surface of the spool.

A still further object of the invention is to provide a slot between the openings of the housing, establishing communication between the openings of the housing, so that the line may be moved through either of the openings by passing the line through said slot.

Still another object of the invention is to provide means for closing the end of the slot adjacent to the end from which the line is unreeled, thereby preventing the line from becoming caught in the slot during the unreeling of the line.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a plan view of a fishing device constructed in accordance with the invention.

Fig. 2 is a sectional view taken on the line 2—2 of Fig. 1.

Fig. 3 is an elevational view illustrating the device in a position with the large opening of the housing disposed downwardly.

Fig. 4 is a sectional view taken on line 4—4 of Fig. 1.

2

Referring to the drawing in detail, the device comprises a housing indicated generally by the reference character 5, the housing having a tapered end 6 terminating in the opening 7.

The reference character 8 indicates an opening in the side wall of the housing, which opening is substantially large as compared with the opening 7, so that the line as well as the sinker may be drawn into the opening and held therein to facilitate carrying of the device.

The openings 7 and 8 are in communication with each other through the slot 9 which is disposed at an oblique angle with respect to the end wall of the housing, so that the fishing line indicated by the reference character 10 may be moved from one opening to the other, as desired.

Formed in the tapered end of the housing at the opening is the annular groove 11 in which the guard ring section 12 is mounted for sliding movement, the guard ring being provided with the finger piece 13 that extends beyond the side of the tapered end and moves through the slot 14, to the end that by moving the guard ring to the position shown by Fig. 4 of the drawing, the slot at the opening 7 will be closed, to prevent the fishing line from entering the slot 9 during the casting of the line.

Mounted within the housing is the spool 14' which rotates on the bearing 15 that is secured to the end wall 16 of the housing, the axis of the spool being at right angles to the opening 8, so that when the line is being reeled on the reel 14', the line will be fed directly to the periphery of the spool at right angles to the direction of rotation of the spool to insure a true winding of the line on the spool. Secured to the bearing 15 is the arm 17 which is provided with the handle 18 by means of which the spool may be rotated in winding or reeling the line thereon.

The reference character 19 includes a spacer disposed between the end wall 16 and the spool, holding the spool in proper spaced relation with respect to the end wall of the housing.

Due to the construction of the tapered end 6 of the housing, the fishing line 10 will, when it is being unreeled from the spool 14, pass over the edge of the spool, so that all danger of the line 10 becoming tangled will be obviated.

In using the device the line is wound on the spool and the fish hook carried by the line is baited in the usual way. The line is now arranged so that it will feed through the opening 7, and when the device is held in the hand and the arm is swung to throw the weighted line from the housing, the line will immediately unreel from the spool 14 much in the same manner as when a line is being cast with the usual fishing rod.

When it is desired to reel in the line, the guard ring section 12 is moved so that the end of the slot 9 adjacent to the guard ring section will be opened admitting the line to the slot which may be moved to a point within the opening 8, whereupon the line may be accurately reeled on the spool 14 and the weight and hook at the end of the line drawn to a position partially within the housing 5.

From the foregoing it will be seen that due to the construction shown and described, I have provided a fishing device which may be used in lieu of the fishing rod and spool for casting during fishing.

Having thus described the invention, what is claimed is:

1. A fishing device comprising a housing having a tapered end portion formed with an opening at its outer extremity and having an opening in the side wall of the housing, a fishing line spool rotatably mounted within the housing directly opposite to the openings, on which the fishing line is wound, said housing having a slot establishing communication between said openings whereby the fishing line may be moved through one opening or the other, said housing having an annular groove in the inner surface thereof adjacent to the first mentioned opening, and a guard ring section supported in said annular groove for rotation around the axis of the groove to a position closing the passageway between the opening and slot.

2. A fishing device comprising a housing having a tapered end portion formed with an opening at its outer extremity and having an opening in the side wall of the housing, a fishing line spool rotatably mounted within the housing directly opposite to said openings, on which a fishing line is wound, said housing having a slot establishing communication between said openings, whereby the fishing line may be moved from one opening to the other, said housing having an annular groove formed in the inner surface of the wall of the first mentioned opening, a guard ring section supported within said annular groove for rotation around the axis of the groove to a position closing the passageway between the opening and slot, and a portion of said guard ring section extending beyond the side of said tapered end of the housing, providing a finger piece for effecting rotation of said guard ring section.

References Cited in the file of this patent

UNITED STATES PATENTS

| Number | Name | Date |
|---|---|---|
| 175,227 | Winans et al. | Mar. 21, 1876 |
| 2,034,917 | Miller | Mar. 24, 1936 |
| 2,551,320 | Ferguson | May 1, 1951 |
| 2,571,440 | Goldberg | Oct. 16, 1951 |
| 2,621,869 | McCash | Dec. 16, 1952 |